UNITED STATES PATENT OFFICE.

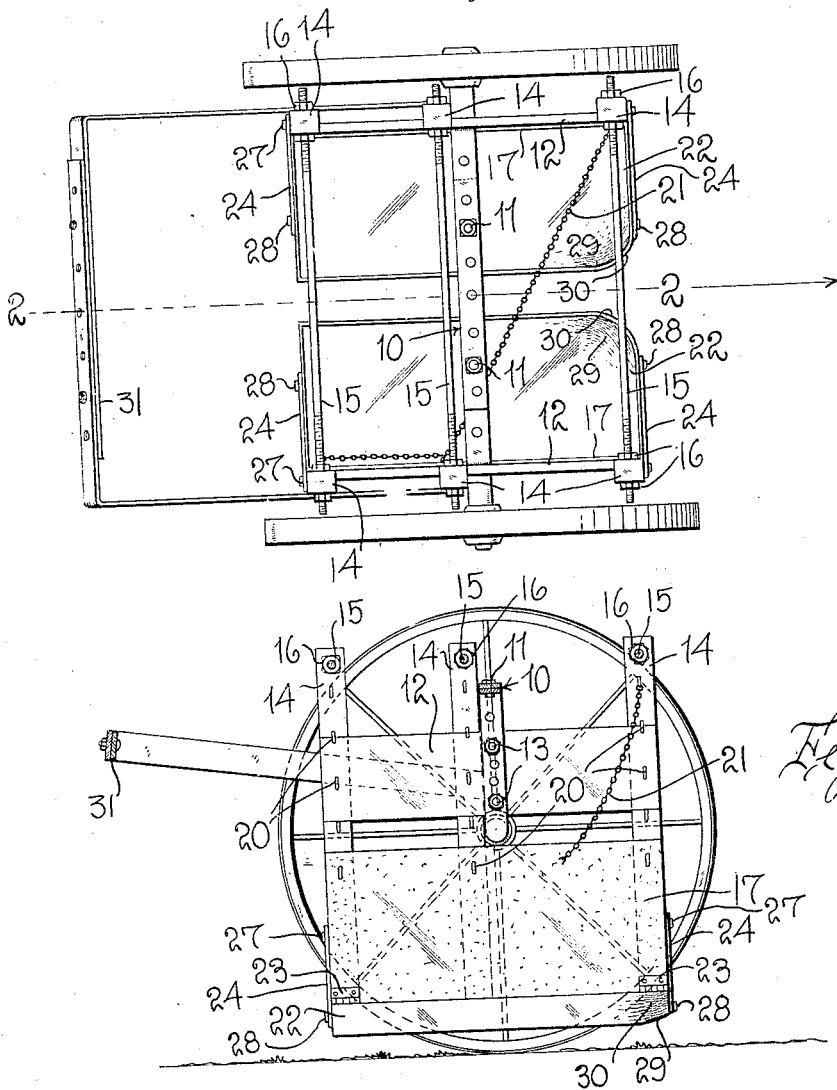

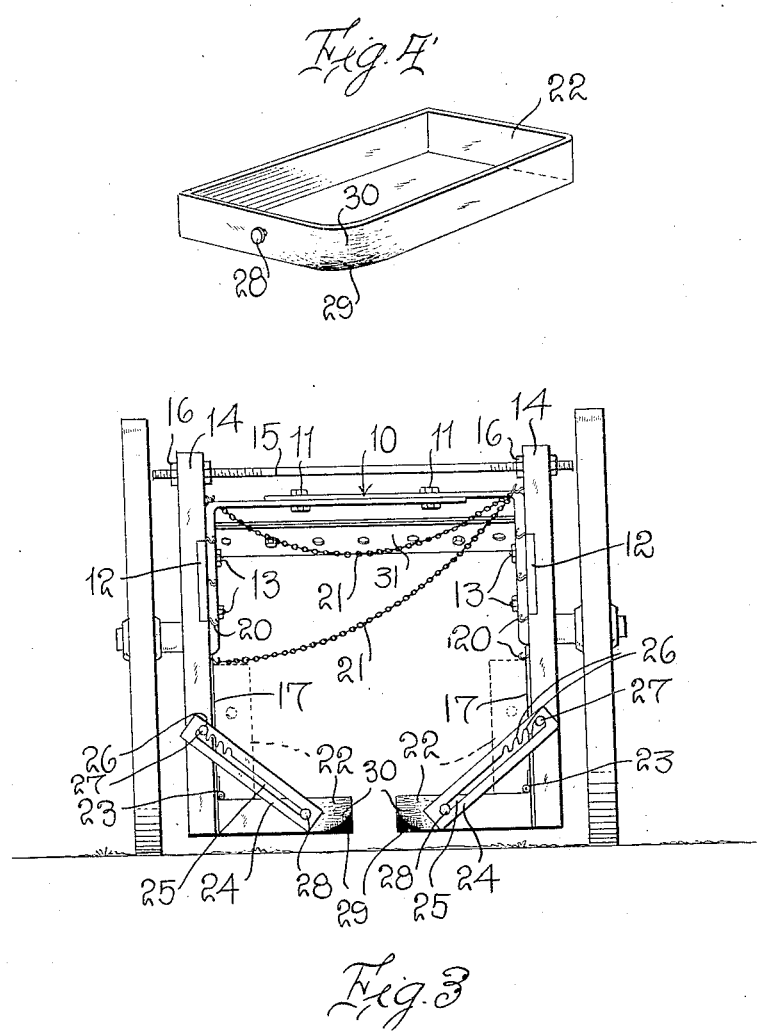

DAVID DUDLEY STEPHENS, OF LOUISVILLE, ALABAMA.

INSECT-CATCHER.

1,220,286.  Specification of Letters Patent.  Patented Mar. 27, 1917.

Application filed July 29, 1916. Serial No. 112,081.

*To all whom it may concern:*

Be it known that I, DAVID DUDLEY STEPHENS, a citizen of the United States, residing at Louisville, in the county of Barbour and State of Alabama, have invented certain new and useful Improvements in Insect-Catchers, of which the following is a specification, reference being had to the accompanying drawings.

This invention relates to devices for trapping insects and particularly to trapping devices which are mounted upon wheels and which are adapted to be passed up and down the rows of growing plants to knock off insects thereon and trap them, the machine being particularly designed for the purpose of catching boll weevils.

The general object of my invention is to provide a device of this character which includes a supporting frame and oppositely disposed trapping pans and provides means whereby the pans may be set farther from or nearer to each other or be disposed either horizontally or at an angle to the surface of the ground so that the pans may ride against the faces of the hills in which the plants are disposed.

A further object is to provide means whereby the frame of the machine may be raised or lowered or increased or decreased in width to suit various circumstances of operation and a still further object is to provide means whereby the chains or other devices used for knocking the insects off of the plants may be adjusted to suit the height of the plants.

Other objects will appear in the course of the following description.

My invention is illustrated in the accompanying drawings, wherein:

Figure 1 is a top plan view of an insect catching machine constructed in accordance with my invention;

Fig. 2 is a section on the line 2—2 of Fig. 1;

Fig. 3 is a front end elevation; and

Fig. 4 is a perspective view of one of the trapping pans.

Referring to these drawings it will be seen that the frame of my device comprises an arched axle designated generally 10 which is made in two sections, the sections overlapping at the middle portions of the frame and these overlapping transverse bars being held in engagement with each other by bolts 11. The transverse bars of the arched axle may either be slotted or formed with a plurality of perforations so that the arched axle may be widened or shortened.

Supported upon the arched axle are the longitudinally extending beams 12 which may be relatively light and are bolted to the downwardly extending portions of the arched axle, there being a plurality of bolt holes for the passage of bolts 13 so that the frame may be raised or lowered. Attached to the beams 12 are a plurality of standards 14, the standards projecting above and below the beams. I have shown three pairs of these standards and each pair of standards is connected at its upper end by means of a transverse bolt 15 carrying the nuts 16. These bolts 15 are sufficiently long so that they will permit the adjustment of the side frames nearer to or farther from each other in consonance with the adjustment of the two sections of the axle. Below the beams 12 the standards 14 support side pieces 17 which may be made of cloth, tin or other light and suitable material. Each of the standards carries a plurality of supporting hooks 20 for the sweeping chains 21.

Hingedly connected to the lower ends of the standards on each side of the machine are the trapping pans 22 which are rectangular in form and are hinged by hinges 23 to the lower ends of the standards so that the trapping pans may be turned either into a horizontal position or turned up against the standards. For the purpose of supporting these pans at a variety of inclinations and yet permitting the pans to have a certain amount of play so that they may follow the contour of the ground, I provide the links 24 which are longitudinally slotted as at 25, the outer end of each slot being formed with a plurality of angularly arranged slots 26 opening into the main slot and being disposed in an angle to the length of the main slot. These slots 26 are adapted to engage over pins 27 extending outward from the end standards, and the inner end of each slot engages over a headed stud 28 extending outward from the adjacent end of the pan. By this means the pans may be supported at any inclination to the horizontal and yet the pans are free to ride upward and thus readily pass over small obstacles or conform to undulations in the surface.

For the purpose of causing the pans to ride easily over the ground the forward end of each pan is upwardly inclined as at 29 and the inner margin of the pan is rounded as at 30.

For the purpose of propelling the device I provide a handle 31 which is suitably attached to the standards 14 and extends rearward therefrom, this handle being so formed that it may be adjusted in consonance with the adjustment of the axle. The chains 21 may be adjustably supported upon the hooks 20 so that the chains may be allowed to depend to a greater or less extent or be taken up or slackened to any extent required or arranged so as to extend at an angle to the line of draft and thus permitting the chains to be disposed in the most effective manner.

While I have illustrated a form of my invention which I have found particularly effective yet I wish to be understood that many changes in the details may be made without departing from the spirit of the invention.

Having described my invention, what I claim is:

1. In an insect catcher of the character described, a supporting frame, oppositely disposed downwardly depending members forming part of the supporting frame and oppositely disposed parallel laterally spaced pans hinged at their outer walls to said depending members for movement into a horizontal plane or into angular relation to a horizontal plane, or into a position parallel to and resting against the depending members, and means for supporting the pans in their adjusted positions.

2. An insect catching device including an arched axle, longitudinally extending beams mounted upon the axle, standards rigidly mounted upon said beams, the standards of one beam being operatively connected to the standards of the opposite beam, a pair of trapping pans hingedly connected to the lower ends of said standards and laterally spaced from each other, means for supporting said trapping pans in a horizontal position or at an angle to the horizontal plane but permitting independent movement of the trapping pans, means for supporting the trapping pans in a raised position, and plant shaking devices adjustably supported upon the standards and depending over the pans.

3. In an insect catcher of the character described, an axle formed of laterally adjustable sections, supporting wheels mounted upon the axle and laterally adjustable with the sections, supporting members depending from the axle, and trapping pans each hingedly supported on the lower ends of the depending members for vertical movement in a vertical plane independent of the supporting members.

In testimony whereof I hereunto affix my signature in the presence of two witnesses.

DAVID DUDLEY STEPHENS.

Witnesses:
 B. G. GRANT,
 V. V. NORTON.